US012559395B2

(12) United States Patent
Paping et al.

(10) Patent No.: US 12,559,395 B2
(45) Date of Patent: Feb. 24, 2026

(54) WASTEWATER OZONE TREATMENT

(71) Applicant: Pewa Systems B.V., Leeuwarden (NL)

(72) Inventors: Lambertus Ludovicus Matheus Joseph Paping, Hulst (NL); Hendrik Rens, Almere (NL)

(73) Assignee: Pewa Systems B.V., Leeuwarden (NL)

( * ) Notice: Subject to any disclaimer, the term of this patent is extended or adjusted under 35 U.S.C. 154(b) by 393 days.

(21) Appl. No.: 18/043,380

(22) PCT Filed: Aug. 31, 2021

(86) PCT No.: PCT/NL2021/050530
§ 371 (c)(1),
(2) Date: Feb. 28, 2023

(87) PCT Pub. No.: WO2022/050838
PCT Pub. Date: Mar. 10, 2022

(65) Prior Publication Data
US 2023/0322595 A1     Oct. 12, 2023

(30) Foreign Application Priority Data

Sep. 1, 2020    (NL) ...................................... 2026394

(51) Int. Cl.
*C02F 1/78*         (2023.01)
*C02F 1/32*         (2023.01)
(Continued)

(52) U.S. Cl.
CPC .................. *C02F 1/78* (2013.01); *C02F 1/32* (2013.01); *C02F 1/722* (2013.01); *C02F 1/725* (2013.01);
(Continued)

(58) Field of Classification Search
CPC .... C02F 1/78; C02F 1/722; C02F 1/32; C02F 1/725; C02F 2201/782; C02F 2209/23; C02F 3/02; C02F 2301/066
(Continued)

(56) References Cited

U.S. PATENT DOCUMENTS

| | | | |
|---|---|---|---|
| 6,024,882 A * | 2/2000 | McNeilly ................ | C02F 1/283 210/759 |
| 6,117,337 A * | 9/2000 | Gonzalez-Martin .... | C02F 1/325 210/748.14 |

(Continued)

FOREIGN PATENT DOCUMENTS

| | | |
|---|---|---|
| CN | 111204899 A | 5/2020 |
| DE | 202009012539 U1 | 2/2011 |

(Continued)

OTHER PUBLICATIONS

Kato et al, English machine translation JP 2020022971, pp. 1-8 (Year: 2020).*

(Continued)

*Primary Examiner* — Claire A Norris
(74) *Attorney, Agent, or Firm* — Banner & Witcoff, Ltd.

(57)         ABSTRACT

In accordance with the present invention there is provided a method for treating a wastewater stream, comprising the steps of:—introducing $O_3$ in the wastewater stream, thereby dissolving at least part of the $O_3$ in the wastewater stream; —optionally irradiating the wastewater stream with ionizing radiation; and—optionally contacting the wastewater stream with a heterogeneous catalyst. In case the ozone treatment is combined with a heterogeneous catalyst, the wastewater treatment can be more effective than with ozone treatment alone, depending on the type of impurities in the wastewater stream. The type of heterogeneous catalyst can be chosen depending on the source of the wastewater and the specific pollutants associated with such wastewater sources. Advan- (Continued)

tageously, the ozone required for this process can be generated by electrolysis of water. In the current energy market, hydrogen ($H_2$), which is also produced during electrolysis of water, is becoming increasingly important as a fuel, and therefore, increasing amounts of hydrogen are being produced, preferably using electricity generated using renewable resources. Therefore, oxygen ($O_2$) and ozone ($O_3$), which are produced alongside hydrogen during water electrolysis, and which are currently often discarded as an invaluable byproduct, can instead be used for wastewater treatment. Therefore, according to another aspect of the invention, there is also provided the use of $O_2$ and/or $O_3$ obtained by electrolysis of water for wastewater treatment.

18 Claims, 1 Drawing Sheet

(51) Int. Cl.
  *C02F 1/72*        (2023.01)
  *C02F 3/02*        (2023.01)
(52) U.S. Cl.
  CPC ............ *C02F 3/02* (2013.01); *C02F 2209/23* (2013.01); *C02F 2305/023* (2013.01)

(58) Field of Classification Search
  USPC ......................................................... 210/760
  See application file for complete search history.

(56) References Cited

U.S. PATENT DOCUMENTS

| | | | |
|---|---|---|---|
| 2002/0153329 | A1 | 10/2002 | Hempel et al. |
| 2002/0185434 | A1* | 12/2002 | Mao ...................... C12M 43/00 |
| | | | 210/603 |
| 2019/0092662 | A1* | 3/2019 | Kubota .......... B01F 23/237613 |

FOREIGN PATENT DOCUMENTS

| | | | | |
|---|---|---|---|---|
| EP | 1021377 | A1 | 7/2000 | |
| JP | 2020022971 | A * | 2/2020 | .............. C02F 1/008 |
| WO | WO-9613463 | A1 * | 5/1996 | .............. C02F 1/025 |
| WO | 99/07642 | A1 | 2/1999 | |

OTHER PUBLICATIONS

Djafer et al, English machine translation WO 9613463, pp. 1-9 (Year: 1996).*
Apr. 15, 2024 (EP) Examination Report Application No. 21798466.5.

* cited by examiner

WASTEWATER OZONE TREATMENT

RELATED APPLICATIONS

This application is a National Stage Application under 35 U.S.C. 371 of co-pending PCT application PCT/NL2021/050530 designating the United States and filed Aug. 31, 2021; which claims the benefit of NL application number 2026394 and filed Sep. 1, 2020, each of which are hereby incorporated by reference in their entireties.

BACKGROUND OF THE INVENTION

The invention is in the field of wastewater treatment. In particular the present invention is directed to a method for treating wastewater and to the use of $O_2$ and/or $O_3$ obtained by electrolysis of water for wastewater treatment.

Water is one of the most important prerequisites for life on earth. Therefore, protecting our water supply is of paramount important. Contaminations and impurities that are present in wastewater, such as medicine residues and other chemical contaminants can end up in the environment via surface water. These contaminants can accumulate in the environment, for instance in living organisms or in freshwater supplies that are used as source for drinking water. Problems associated with this accumulation of contaminations in the environment include the extinction of species and increased intake of toxic substances by humans. In addition, accumulation of medicine residues in the environment could lead to evolution of resistant bacteria. Therefore, it is very important that wastewater that is discharged into the environment, such as municipal wastewater or wastewater water from industrial applications is cleaned thoroughly. If wastewater can be purified to an extent that it is clean and safe enough to be re-used as e.g. drinking water, purified wastewater could even be used to reduce the dependence on freshwater sources, thereby closing the water cycle.

Wastewater is typically purified in wastewater treatment plants (WWTPs). Wastewater treatment at such plants typically comprises decomposition of contaminants by microorganisms under aerobic conditions. However, a disadvantage of this process is that these microbes are typically not capable of achieving the purification that would be needed for instance if the wastewater were to be re-used as drinking water. In the past decades, there has been growing concerns over certain chemicals that are especially difficult to be removed from wastewater. These chemicals are sometimes referred to as micropollutants, persistent organic pollutants (POPs), environmentally persistent pharmaceutical pollutants (EPPPs), or "forever chemicals". In addition to medicine remains, these pollutants include diagnostic contrast media, agriculture chemicals, and firefighting retardant foams. Because these pollutants are not easily removed from wastewater using conventional methods, additional purification steps have to applied to further purify the wastewater. Known additional purification steps include oxidation of impurities with ozone ($O_3$), and adsorption of impurities using activated carbon.

On the other hand, wastewater treatment processes are typically very energy-intensive. Further treatment and purification of wastewater typically results in increasing energy use. If the required additional energy for improved wastewater purification is generated using fossil fuels, improved wastewater purification could lead to other environmental problems.

In addition, some of the additional purification steps also have other disadvantages. For instance, for oxidation of pollutants using ozone, also known as ozonation, ozone is typically generated from air using an ozone generator. This not only leads to increased energy use and increased costs for wastewater treatment, but may also lead to the generation of toxic impurities, such as bromate ions. Bromate, which is a suspected human carcinogen, is formed by oxidation of bromide and/or other bromine-containing compounds, which is typically present in wastewater. Bromide is typically present in seawater as well as most sweet surface waters in concentrations around 200 µg $Br^-$ per liter. If all this bromide would be converted into bromate, this would result in concentrations of bromate around 300 µg per liter, whereas recommended amounts of bromate according to health standards are typically 1-10 µg per liter or even lower. For these reasons, ozonation of wastewater is typically used as little as possible. Specifically, when ozone is used, low concentrations of ozone are typically applied in order to prevent unwanted formation of bromate. In some cases, instead of introducing a large amount of ozone in a wastewater stream at once, several smaller amounts of ozone are added to a wastewater stream at different locations in a reactor in order to keep the ozone concentration low and to prevent the formation of bromate. This may result in complicated reactor design.

Another downside of the low concentrations of ozone that are typically applied in wastewater treatment is that chemicals that are especially difficult to be removed from wastewater are not effectively removed from the wastewater stream by ozonation. This means that some of these chemicals remain in the treated wastewater stream, or that additional non-trivial purification steps are needed to remove these chemicals from the wastewater stream.

An object of the present invention is to improve wastewater purification processes.

Another object of the invention is to provide treated wastewater containing lower amounts of pollutants or contaminants that are harmful for the environment or human health.

Another object of the invention is to increase energy-efficiency, and/or to decrease the use of fossil fuels wastewater treatment processes.

BRIEF SUMMARY OF THE INVENTION

In accordance with the present invention there is provided a method for treating a wastewater stream, comprising the steps of:

introducing $O_3$ in the wastewater stream, thereby dissolving at least part of the $O_3$ in the wastewater stream;

optionally irradiating the wastewater stream with ionizing radiation; and optionally contacting the wastewater stream with a heterogeneous catalyst.

In case the ozone treatment is combined with a heterogeneous catalyst, the wastewater treatment can be more effective than with ozone treatment alone, depending on the type of impurities in the wastewater stream. The type of heterogeneous catalyst can be chosen depending on the source of the wastewater and the specific pollutants associated with such wastewater sources. Advantageously, the ozone required for this process can be generated by electrolysis of water. In the current energy market, hydrogen ($H_2$), which is also produced during electrolysis of water, is becoming increasingly important as a fuel, and therefore, increasing amounts of hydrogen are being produced, preferably using electricity generated using renewable resources. Therefore, oxygen ($O_2$) and ozone ($O_3$), which are produced alongside hydrogen during water electrolysis, and which are currently often discarded as an invaluable byproduct, can instead be used for wastewater treatment.

Therefore, according to another aspect of the invention, there is also provided the use of $O_2$ and/or $O_3$ obtained by electrolysis of water for wastewater treatment.

DETAILED DESCRIPTION OF THE INVENTION

Figure 1:
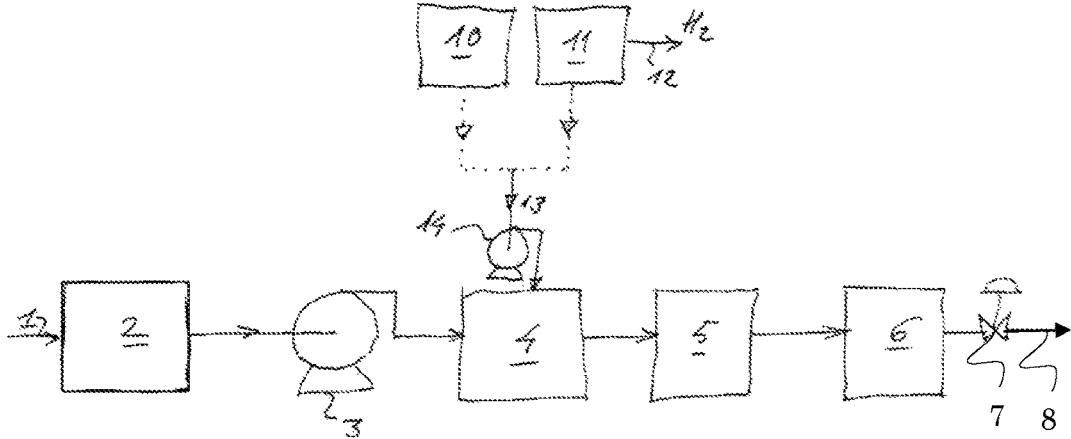
FIG. 1 is a schematic representation of the method according to an embodiment of the invention.

According to the invention there is provided a method for treating a wastewater stream, comprising the steps of:

introducing $O_3$ in the wastewater stream, thereby dissolving at least part of the $O_3$ in the wastewater stream;

optionally irradiating the wastewater stream with ionizing radiation; and optionally contacting the wastewater stream with a heterogeneous catalyst.

The organic and/or inorganic impurities which may be present in the wastewater stream can be oxidized by the $O_3$ that is dissolved in the wastewater stream.

Depending on the amount and type of impurities in the wastewater stream, introducing $O_3$ in the wastewater stream may be sufficient for oxidizing the impurities into less harmful species and/or species that can be removed from the wastewater stream more easily. However, in some cases it might be necessary to combine the ozone treatment with irradiating the wastewater stream with ionizing radiation and/or contacting the wastewater stream with a heterogeneous catalyst.

For instance, in case of municipal wastewater, which typically contains a wide variety of organic impurities including e.g. medicine residues that are difficult to remove, it may be needed to combine ozone treatment with irradiating the wastewater stream with ionizing radiation and/or contacting the wastewater stream with a heterogeneous catalyst. However, in case of other wastewater streams containing a known amount of impurities of which it is known that they can be oxidized by ozone treatment alone, it might not be necessary to combine ozone treatment with irradiating the wastewater stream with ionizing radiation and/or contacting the wastewater stream with a heterogeneous catalyst. Such wastewater streams with known amounts of impurities may for instance be industrial wastewater streams, such as wastewater streams originating from the production of foods or beverages. After purification using ozone alone, or using ozone in combination with a heterogeneous catalyst and/or irradiation using ionizing radiation, such wastewater streams may be used again directly for the production of foods or beverages.

In case ozone treatment is combined with a heterogeneous catalyst, the wastewater treatment is more effective than with ozone treatment alone. Without wishing to be bound by theory, the inventors believe that the combination of dissolved ozone with a heterogeneous catalyst leads to an increased formation of hydroxyl radicals. Because of the higher oxidation potential of hydroxyl radicals compared to the oxidation potential of ozone, the increased hydroxyl radical formation that is caused by the combination of ozone with a heterogeneous catalyst leads to better results than oxygenation of impurities directly by ozone. Irradiating the wastewater stream with ionizing radiation, such as UV-C radiation, may lead to an even larger increase in hydroxyl radicals. Therefore, the combination of ozone with a heterogeneous catalyst, and optionally ionizing radiation has a positive effect on the extent to which impurities can be removed from the wastewater stream.

Also, using the combination of ozone with a heterogeneous catalyst, and optionally ionizing radiation, less time is required to remove impurities from the wastewater stream compared to existing ozonation processes.

Preferably, the amount of dissolved $O_3$ is present in the wastewater stream in excess with regard to the amount of organic and/or inorganic impurities. This results in better removal and/or oxidation of difficult to remove impurities.

Although it is preferred to provide ozone in excess with respect to the impurities in the wastewater stream that are to be oxidized, it is not desired to provide a larger excess of ozone than required to oxidize all impurities. Therefore, the total amount of impurities to be oxidized is preferably monitored upstream of the point where ozone is introduced in the wastewater stream.

In case the wastewater stream comprises one or more bromine-containing compounds, an excess of dissolved $O_3$ in the wastewater stream may lead to the formation of bromate.

In case bromate is formed, additional steps may be needed to remove bromate from the wastewater stream. Therefore, the method of the invention may be followed by the steps of:

removing the unreacted $O_3$ from the wastewater stream; followed by contacting the wastewater stream with a reducing agent capable of reducing bromate.

Removing the unreacted $O_3$ from the wastewater stream can for instance be done by contacting the wastewater stream with activated carbon, which removes unreacted $O_3$ from the wastewater stream by reducing the unreacted $O_3$ into $O_2$.

In this disclosure, the terms "activated carbon", "carbon", and "charcoal" are used interchangeably to refer to carbonaceous materials, with varying degrees of crystallinity, in which carbon is present at the surface, available for reacting with other materials and/or for other materials to adsorb onto. Such carbonaceous materials are often porous, which positively contributes to their surface area. A wide variety of these materials is available, and the skilled person can select the suitable carbonaceous material depending on its desired use (e.g. as an adsorbent, or as a reducing agent, or both).

Selection of reducing agents that are suitable for reducing bromate can be done based on the reduction potentials of the reducing agents. Generally speaking, a redox reaction can occur when the reduction potential ($E_h$) of the oxidizer is higher than the reduction potential of the reducer. Since the standard reduction potential ($E_0$) is defined at pH=0, the reduction potentials should be corrected for the actual pH of the wastewater stream. For instance, pH=8.5 can be considered a typical pH value for a wastewater stream, and is therefore used as example hereinbelow. This means that the reduction potential for redox half reactions in which H+ and/or OH— participate in the reaction, the reduction potential should be corrected accordingly. The reduction potential can be corrected using the following equations:

$$E_h = E_0 - (\text{pH of wastewater stream} - 0) * 0.0592 * (\text{number of } H^+ \text{ ions being}$$

consumed in the reduction)/(valency change in the half reaction); or $$E_h = E_0 + (14 - \text{pH of wastewater stream})*0.0592*(\text{number of OH}^- \text{ ions})$$

being formed in the reduction)/(valency change in the half reaction).

Preferably, a reducing agent is selected that does not lead to new contamination of the wastewater stream as a result of oxidation of the reducing agent by bromate. Therefore, it is preferred that oxidation of the reducing agent results in the formation of harmless compounds and/or compounds that are easily removed from the wastewater stream, for instance gases such as $O_2$, $N_2$, and/or $CO_2$.

In table 1, reduction potentials for half-reactions involving different reducing agents are listed, as well as reduction potentials for half-reactions involving ozone and bromate.

TABLE 1

Reduction potentials for different half-reactions

| half-reaction | $E_0$ - standard reduction potential (V) | $E_h$ - reduction potential at pH = 8.5 (V) |
|---|---|---|
| $O_3 + 2\,H^+ + 2\,e^- \rightarrow O_2 + H_2O$ | 2.076 | 1.57 |
| $Br_{2\,(aq)} + 2\,e^- \rightarrow 2\,Br^-$ | 1.09 | 1.09 |
| $BrO_3^- + 6\,H^+ + 6\,e^- \rightarrow Br^- + 3\,H_2O$ | 1.423 | 0.92 |
| $BrO_3^- + 3\,H_2O + 6\,e^- \rightarrow Br^- + 6\,OH^-$ | 0.60 | 0.92 |
| $BrO_3^- + 6\,H^+ + 5\,e^- \rightarrow \frac{1}{2}\,Br_{2\,(l;\,aq)} + 3\,H_2O$ | 1.482 | 0.88 |
| $HBrO + H^+ + e^- \rightarrow \frac{1}{2}\,Br_{2\,(aq)} + H_2O$ | 1.574 | 1.07 |
| $BrO_3^- + 5\,H^+ + 4\,e^- \rightarrow HBrO_{(aq)} + 2\,H_2O$ | 1.45 | 0.82 |
| $N_2 + 4\,H_2O + 4\,e^- \rightarrow N_2H_{4\,(aq)} + 4\,OH^-$ | −1.16 | −0.83 |
| $N_2 + 4\,H^+ + 4\,e^- \rightarrow N_2H_{4\,(aq)}$ | −0.33 | −0.83 |
| $O_2 + 2\,H_2O + 2\,e^- \rightarrow H_2O_{2\,(aq)} + 2\,OH^-$ | 0.15 | 0.48 |
| $H_2O_{2\,(aq)} + 2\,H^+ + 2\,e^- \rightarrow 2\,H_2O$ | 1.77 | 1.27 |
| $CO_2 + 4\,H^+ + 4\,e^- \rightarrow CH_2O_{(aq)} + H_2O$ | −0.43 | −0.93 |
| $CO_2 + 6\,H^+ + 6\,e^- \rightarrow CH_3OH_{(aq)} + H_2O$ | −0.39 | −0.89 |
| $CO_2 + 2\,H^+ + 2\,e^- \rightarrow CH_2O_{2\,(aq)}$ | −0.20 | −0.70 |
| $CO_2 + 4\,H^+ + 4\,e^- \rightarrow C + 2\,H_2O$ | 0.21 | −0.29 |

In order to effectively reduce bromate, it is preferred that the wastewater stream does not comprise stronger oxidizers than bromate, such as ozone. For that reason, the excess $O_3$ is preferably removed from the wastewater stream before contacting the wastewater stream with a reducing agent capable of reducing bromate.

However, the steps of removal of excess $O_3$ and the step of contacting the wastewater stream with a reducing agent capable of reducing bromate can also advantageously be combined. For instance, the wastewater stream can be contacted with a reducing agent that is capable of reducing, (and thereby removing) $O_3$, and also capable of reducing bromate. Since $O_3$ is a stronger oxidizer than bromate, the reducer will start reducing bromate once all $O_3$ is reduced. For instance, the wastewater stream can be passed over a charcoal bed after the impurities in the wastewater stream have reacted with ozone. In the first region of the charcoal bed, $O_3$ (being a stronger oxidizer than bromate) is removed (i.e., reduced). After the $O_3$ has been removed, bromate can be reduced by the subsequent part of the charcoal bed, because the stronger oxidizer ozone is no longer present.

From the reduction potentials in table 1, it can be seen that at pH=8.5, compounds such as hydrazine ($N_2H_4$), hydrogen peroxide ($H_2O_2$), and methanol ($CH_3OH$) can be suitable reducing agents for reducing bromate. In case hydrazine is used as reducing agent, the following redox reaction could for instance occur:

$$BrO_3^- + 1\%\ N_2H_4 \rightarrow Br^- + 1\%\ N_2 + 3\ H_2O$$

with the following half-reactions:

$BrO_3^- + 6\ H^+ + 6\ e^- \rightarrow Br^- + 3\ H_2O$ ($E_h$ at pH 8.5=0.92 V)

$1\frac{1}{2}\ N_2H_{4\ (aq)} + 6\ OH^- \rightarrow 1\frac{1}{2}\ N_2 + 6\ H_2O + 6\ e^-$ ($E_h$ at pH 8.5=−0.83 V).

In case hydrogen peroxide is used as reducing agent the following redox reaction could for instance occur:

$$BrO_3^- + 3\ H_2O_2 \rightarrow Br^- + 3\ O_2 + 3\ H_2O$$

with the following half-reactions:

$BrO_3^- + 6\ H^+ + 6\ e^- \rightarrow Br^- + 3\ H_2O$ ($E_h$ at pH 8.5=0.92 V)

$3H_2O_{2\ (aq)} + 6OH^- \rightarrow 3\ O_2 + 6H_2O + 6\ e^-$ ($E_h$ at pH 8.5=0.48 V).

Carbon may also be suitable as a reducing agent for reducing bromate, for instance in the form of activated carbon. In case carbon is used as reducing agent, the following redox reaction could for instance occur:

$$BrO_3^- + 1\%\ C \rightarrow Br^- + 1\frac{1}{2}\ CO_2$$

with the following half-reactions:

$BrO_3^- + 6\ H^+ + 6\ e^- \rightarrow Br^- + 3H_2O$ ($E_h$ at pH 8.5=0.92 V)

$1\frac{1}{2}\ C + 6OH^- \rightarrow 1\%\ CO_2$ (as $HCO_{3(aq)}$) $+3H_2O + 6e^-$ ($E_h$ at pH 8.5=−0.29 V).

The skilled person may select the appropriate reducing agent based on the reduction potential of half-reactions of bromate and of the reducing agent under the conditions (e.g. pH, temperature, other reducers and/or oxidizers present in the wastewater stream) of the specific wastewater stream. The skilled person may also appreciate that certain compounds can act as an oxidizer under a certain set of conditions, and as a reducer under different conditions. For instance, hydrogen peroxide may act as an oxidizer with respect to a wide variety of impurities that may be present in the wastewater stream. However, when only bromate is present is present in the wastewater stream, hydrogen peroxide may act as a reducing agent.

Preferably, the reducing agent is provided in the exact amount that is required to reduce the bromate, and not in excess. If an excess of reducing agent would be added, some of the reducing agent for reducing the bromate could remain in the purified wastewater stream, which is undesired. However, in case a solid reducing agent such as activated carbon is used, it is less important to provide exactly the right amount of reducing agent, because excess of a solid reducing agent can be easily separated from the purified wastewater stream, for instance using filtration.

It is also possible to contact the wastewater stream to more than one reducing agent after ozonation. For instance, the wastewater stream may first be contacted with activated carbon, and after than with another (e.g. stronger) reducing agent, in order to lower the concentration of bromate even more.

In order to be able to provide the required amount of reducing agent for reducing bromate, the concentration of bromate can be monitored on-line or in-line (for instance using redox measurement, which directly measures the redox potential of a stream) or by regularly taking samples from the wastewater stream (for instance using ion chromatography). Preferably, monitoring the concentration of bromate is performed on wastewater stream after it is subjected to ozone treatment and optionally to irradiation and optionally to a heterogeneous catalyst, and before the wastewater stream is contacted with a reducing agent capable of reducing bromate.

Because the solubility of ozone gas in water increases with increasing pressure of the system, the wastewater stream with dissolved $O_3$ is preferably kept at a pressure above atmospheric pressure in order to achieve higher concentrations of ozone in the wastewater stream. In embodiments, the wastewater stream with dissolved $O_3$ is kept at a pressure of 1 barg or higher, preferably 2 barg or higher, such as 3 barg or higher, or even 4 barg or higher. In other words, the amount of $O_3$ introduced in the wastewater stream is preferably such that the partial pressure of $O_3$ gas in contact with the wastewater stream is kept above atmospheric pressure. Preferably, the partial pressure of $O_3$ gas is kept at a pressure of 1 barg or higher, more preferably 2 barg or higher, such as 3 barg or higher, or even 4 barg or higher. In order to achieve such pressures one or more pumps and/or compressors may be used. The pressure can be controlled using e.g. a back pressure regulator.

Another approach that can additionally or alternatively be used to increase the concentration of dissolved ozone in the wastewater stream is by generating micro- and/or nanobubbles of ozone, for instance by using a venturi system.

Preferably, the concentration of ozone in the wastewater stream is 2 mg/L or more, more preferably 5 mg/L or more, even more preferably 8 mg/L or more, such as 10 mg/L or more or even 20 mg/L or more. The concentration of ozone in the wastewater stream can be as high as 30 mg/L or even higher, for instance 5-30 mg/L or 10-30 mg/L.

Additionally, one or more peroxides may be added to the wastewater stream. Peroxides, such as hydrogen peroxide, also have a high oxidation potential, and can also be used to break down wastewater contaminants. However, as explained above, depending on where in the process peroxides are added, peroxides such as hydrogen peroxide can also act as a reducer that is able to reduce bromate.

In embodiments, the ionizing radiation is UV radiation, preferably UV-C radiation.

As used herein, wastewater stream can refer to any kind of water stream that contains contaminations or impurities. For instance, it can refer to municipal wastewater, which typically contains significant organic impurities such as medicine residues. Additionally or alternatively, wastewater stream can also refer to discharge water of an industrial process. The impurities in industrial wastewater are very dependent on the specific industrial process, but large amounts of persistent organic pollutants can also be present. Preferably, these organic pollutants are oxidized and/or mineralized, allowing them to be more easily removed from the wastewater. The wastewater stream may also be surface water or any other contaminated water source that needs to be purified in order to produce water that is safe to drink, for instance in remote areas with limited access to safe drinking water.

The heterogeneous catalyst can facilitate the creation of hydroxyl radicals, but it can also directly catalyze oxidation or reduction reactions of impurities at the catalyst surface. Alternatively or additionally, impurities can also be adsorbed at the surface of the heterogeneous catalyst.

The amount and nature of impurities in the wastewater stream is dependent on many factors, such as the source of the wastewater stream (e.g., municipal wastewater or industrial wastewater), and the extent to which the wastewater stream is already purified upstream of the ozone treatment. In addition to the impurities that were originally present in the wastewater, also new impurities originating from the ozonation process can be present in the wastewater stream. Because of the large variety of impurities that may be present, the heterogeneous catalyst preferably acts as one or more selected from oxidation catalyst, reduction catalyst, and radical formation catalyst. For instance, the catalytically active material can be selected oxidation and/or reduction catalysts such as transition metals. For example, the catalytically active material or materials may comprise one or more of Sc, Ti, V, Cr, Mn, Fe, Co, Ni, Cu, Zn, Mg, and oxides thereof. Other examples of heterogeneous catalysts include zeolites, solid bases, and carbonaceous materials, such as activated carbon.

Since most surface waters as well as wastewaters contain bromide as a natural salt, impurities caused by ozonation may include bromoform, bromopicrin, (di)bromoacetic acid, dibromo-acetonitriles, bromoacetone, cyanogen bromide, bromoketones, bromonitriles, bromoalkanes and bromohydrins, including triazoles such as benzo-, and toluene-triazole; as well as bromate. For instance, activated carbon or other reducing catalysts can be used to reduce toxic substances such as bromate. In addition to being suitable as a catalyst, activated carbon can also serve as an adsorbent and/or as a reducing agent to remove impurities from the wastewater stream. In embodiments, downstream of the heterogeneous catalyst, the wastewater stream is contacted with activated carbon, which can act, for instance, as a catalyst, reducing agent, and/or as an adsorbent. Activated carbon can for instance be used to reduce or absorb bromate. As mentioned before, activated carbon can also be used for both the steps of removing unreacted $O_3$ from the wastewater stream, and reducing bromate.

The selection of heterogeneous catalysts or a combination of different catalysts that are suitable for use in the method according to the reaction is very dependent on the specific impurities present in the wastewater stream and their concentrations, as well as the intended use and the desired purity of the wastewater stream after purification treatment.

Preferably, the heterogeneous catalyst is supported on a structured support material. The structured support material obviates the need to remove the heterogeneous catalyst in a separate step by e.g. filtration. The support material preferably has a high surface area, because in that way, a large surface area of heterogeneous catalyst can be obtained using small amounts of catalytically active material. Preferably, the support material has an open structure, resulting in a low restriction and pressure drop of the flow through the catalyst bed.

Suitable support materials include ceramic materials, such as metal oxides or metal carbides. For instance, cordierite, a magnesium iron aluminium cyclosilicate can be used. Other examples of suitable support materials include oxides of aluminum, magnesium, calcium, silicon, zirconium, titanium, cerium, and combinations thereof.

In addition to providing a high surface area support for the catalyst, the support material may also be catalytically active itself.

All standard casting processes can be used for producing the structures support material, such as sand casting, shell mould casting, investment casting, permanent mould casting and low-pressure die as well as dip casting.

The structured support material may for instance be shaped in the form of a cylindrical monolith, which can be advantageously mounted into a cylindrical tube.

The method of the invention can be applied after an aerobic wastewater treatment reactor, in order to remove impurities that were not removed by the microbes in the aerobic reactor. Alternatively or additionally, the method of the invention can also be applied upstream of an aerobic reactor. In this way, impurities are already partially oxidized and/or broken down before the microbial purification reaction. These smaller impurities can be broken down by the microbes in the aerobic reactor more efficiently. If ozonation is performed upstream of the aerobic reactor, there may be less formation of toxic byproducts, such as bromate.

Advantageously, $O_3$ may be added as a mixture comprising $O_2$ and $O_3$. Such a mixture comprising $O_2$ and $O_3$ can for instance be obtained by using an ozone generator, or ozonator, to generate ozone from oxygen or air. A high concentration of ozone in the gas mixture is preferred. If ozone is produced by ozonation of air, the concentration of ozone in the gas mixture will generally be low, because of the large amount of nitrogen that is present in air. If ozone is produced by electrolysis of water, a mixture comprising $O_2$ and $O_3$ with higher concentrations of ozone in the gas mixture can typically be reached, because of the absence of other gases such as nitrogen. Preferably, the mixture comprises 5 wt. % or more of $O_3$, more preferably 8 wt. % or more, such as 10 wt. % or more. Typically, the maximum concentration of $O_3$ in the mixture comprising $O_2$ and $O_3$ that can be produced using water electrolysis is ca. 20 wt. %, the rest of the mixture being $O_2$. Therefore, the mixture may comprise 5-20 wt. % of $O_3$. However, when available, mixtures with higher $O_3$ concentrations may also be used.

Preferably, the $O_3$ is obtained by electrolysis of water. In the current energy market, hydrogen, which is also produced during electrolysis of water, is becoming increasingly important as a fuel, and therefore, increasing amounts of hydrogen are being produced, preferably using electricity generated using renewable resources. Therefore, oxygen and ozone, which are produced alongside hydrogen during water electrolysis, and which are currently often discarded as an invaluable byproduct, can instead be used for wastewater treatment. The amount of $O_3$ produced during electrolysis of water can be controlled, for instance by adjusting the applied voltage during water electrolysis. Typically, higher voltages during water electrolysis lead to more $O_3$ generation.

By lowering the pressure of the wastewater stream prior to introduction of $O_3$, carbon dioxide or other ozone scavengers that might be present can be removed from the wastewater stream. Removing ozone scavengers, such as carbonate ions, leads to more efficient use of ozone for the creation of hydroxyl radicals and oxidation of contaminants. Another effect of removing carbon dioxide is that the wastewater will be more alkaline, therefore, more hydroxyl radicals can be formed per amount of ozone, without the need for adding other chemicals for adjusting the pH of the wastewater.

It was found that control of the wastewater treatment process of the invention can be obtained by redox measurement, which can for instance be performed on-line or in-line, thereby avoiding the need to take samples for off-line analysis. For instance, the measured redox potential of effluent (7) from the step of contacting with a heterogeneous catalyst can be used as an input to control the addition of ozone stream (13). The measured redox potential of any liquid stream in the process of the invention can be used as an input for a control loop to control another process parameter, such as temperature, pressure, concentration, residence time, etc. The advantage of using redox measurement is that it is a highly robust and sensitive measurement. Also redox potential measurements can be carried out at sampling frequencies that are relatively short, typically around 2 seconds or less, e.g. 0.1-1 second.

For instance, the amount of $O_3$ excess can be monitored by redox measurement. Preferably, the oxidation reduction potential (ORP) value measured using a platinum electrode in the wastewater stream after introducing $O_3$ is 800 mV or higher, or 850 mV or higher, for instance 800-900 mV.

The method according to the invention is preferably carried out on neutral or slightly alkaline wastewater, but can also be applied on acidic wastewater.

According to another aspect of the invention, there is provided the use of $O_2$ and/or $O_3$ obtained by electrolysis of water for wastewater treatment.

Additionally, $O_2$ obtained by electrolysis of water can also be used for the combustion of solid waste that is produced during wastewater treatment, such as sludge. By using higher concentrations of oxygen instead of air which only contains ca. 20 vol. % of oxygen and large amounts of nitrogen, the combustion leads to less harmful combustion products such as nitrogen oxides.

Additionally, $O_2$ obtained by electrolysis of water can also be used to aerate an aerobic reactor of a wastewater treatment plant. By using higher concentrations of oxygen instead of air which only contains ca. 20 vol. % of oxygen and large amounts of nitrogen, the microbes in the aerobic reactor can break down contaminants more efficiently.

The concentration of $O_2$ in the gas used for combustion of solid waste or aerating an aerobic reactor can be adjusted by mixing the pure oxygen with air.

In FIG. 1 a schematic representation of the method according to an embodiment of the invention is shown. Wastewater stream (1) is typically purified in wastewater treatment plant (2), for instance in an aerobic reactor. The effluent of the wastewater treatment plant (2) can be pressurized using compressor or pump (3). $O_3$ (13), for instance in the form of a mixture comprising $O_2$ and $O_3$, can also be pressurized using compressor or pump (14), and is introduced and dissolved in the wastewater stream in mixing zone (4). The $O_3$ or mixture of $O_2$ and $O_3$ (13) can be produced from air or oxygen by ozonator (10) or it can be one of the products from water electrolysis (11), with $H_2$ (12) being another product that is produced during water electrolysis (11). The wastewater stream with dissolved $O_3$ can optionally be irradiated with ionizing radiation in irradiation zone (5) and is optionally contacted with heterogeneous catalyst (6). The pressure of the wastewater stream with dissolved $O_3$ can be regulated by back pressure regulator (7). Purified effluent (8) is obtained. The purified effluent (8) can be further treated, for instance by contacting it with activated carbon and/or other reducing agents, thereby, e.g., reducing bromate concentration.

Figure 2:
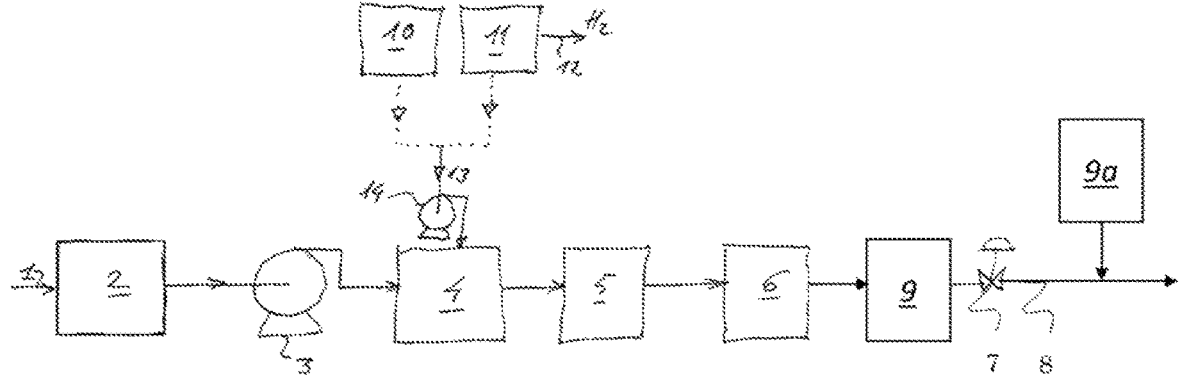
FIG. 2 also shows a schematic representation of the method according to an embodiment of the invention.

FIG. 2 also shows a schematic representation of the method according to an embodiment of the invention. Wastewater stream (1) is typically purified in wastewater treatment plant (2), for instance in an aerobic reactor. The effluent of the wastewater treatment plant (2) can be pressurized using compressor or pump (3). $O_3$ (13), for instance in the form of a mixture comprising $O_2$ and $O_3$, can also be pressurized using compressor or pump (14), and is introduced and dissolved in the wastewater stream in mixing zone (4). The $O_3$ or mixture of $O_2$ and $O_3$ (13) can be produced from air or oxygen by ozonator (10) or it can be one of the products from water electrolysis (11), with $H_2$ (12) being another product that is produced during water electrolysis (11). The wastewater stream with dissolved $O_3$ can optionally be irradiated with ionizing radiation in irradiation zone (5) and is optionally contacted with heterogeneous catalyst (6). Subsequently, the wastewater stream is optionally contacted with activated carbon (9), resulting in removal of unreacted $O_3$ from the wastewater stream, and reduction of bromate. The pressure of the wastewater stream with dissolved $O_3$ can be regulated by back pressure regulator (7). Purified effluent (8) is obtained. If needed, for instance in case contacting with activated carbon (9) did not reduce bromate concentration enough, purified effluent (8) can be further treated, for instance by adding one or more other reducing agents capable of reducing bromate (9a) to purified effluent (8), thereby further reducing bromate concentration.

The invention claimed is:

1. A method for treating a wastewater stream comprising one or more bromine-containing compounds, comprising the steps of:

introducing $O_3$ in the wastewater stream, thereby dissolving at least part of the $O_3$ in the wastewater stream;

optionally irradiating the wastewater stream with ionizing radiation; and optionally contacting the wastewater stream with a heterogeneous catalyst, followed by the steps of:

removing the unreacted $O_3$ from the wastewater stream; followed by contacting the wastewater stream with one or more reducing agents capable of reducing bromate.

2. The method according to claim 1, wherein the wastewater stream contains organic and/or inorganic impurities, and wherein the amount of dissolved $O_3$ is present in the wastewater stream in excess with regard to the amount of organic and/or inorganic impurities.

3. The method according to claim 1, wherein the one or more reducing agents capable of reducing the bromate comprises one or more of carbon, hydrogen peroxide, hydrazine, or methanol.

4. The method according to claim 1, wherein the one or more reducing agents capable of reducing the bromate comprises hydrogen peroxide.

5. The method according to claim 1, wherein the concentration of bromate upstream of the step of contacting the wastewater stream with a reducing agent capable of reducing bromate is monitored, and wherein the amount of reducing agent with which the wastewater stream is contacted is adjusted based on the monitored bromate concentration.

6. The method according to claim 1, wherein the wastewater stream with dissolved $O_3$ is at a pressure above atmospheric pressure.

7. The method according to claim 1, wherein the amount of $O_3$ introduced in the wastewater stream is such that the partial pressure of $O_3$ gas in contact with the wastewater stream is kept above atmospheric pressure.

8. The method according to claim 7, wherein said partial pressure is 1 barg or higher.

9. The method according to claim 1, comprising contacting the wastewater stream with a heterogeneous catalyst supported on a structured support material.

10. The method according to claim 9, wherein the structured support material comprises one or more of silicon, aluminum, magnesium, calcium, zirconium, titanium, or cerium, or oxides or carbides thereof.

11. The method according to claim 1, comprising contacting the wastewater stream with a heterogeneous catalyst comprising an oxidation catalyst, reduction catalyst, or adsorbent.

12. The method according to claim 1, comprising contacting the wastewater stream with a heterogeneous catalyst comprising one or more transition metals.

13. The method according to claim 1, comprising the step of irradiating the wastewater stream with UV ionizing radiation.

14. The method according to claim 1, wherein one or more peroxides are added to the wastewater stream.

15. The method according to claim 1, comprising contacting the wastewater stream with a heterogeneous catalyst and further comprising the step of:

downstream of the heterogeneous catalyst, contacting the wastewater stream with activated carbon.

16. The method according to claim 1, wherein the $O_3$ is introduced into the wastewater stream as a mixture comprising $O_2$ and $O_3$.

17. The method according to claim 1, wherein the $O_3$ is obtained by electrolysis of water.

18. The method according to claim 1, wherein the wastewater stream comprises effluent of an aerobic wastewater reactor.

\* \* \* \* \*